Jan. 17, 1956  R. A. SCHNEIDER  2,730,754
APPARATUS FOR REMOVING THE CASING OF LINK
SAUSAGE AND STRUCTURALLY LIKE PRODUCTS
Original Filed Dec. 31, 1949  2 Sheets-Sheet 1
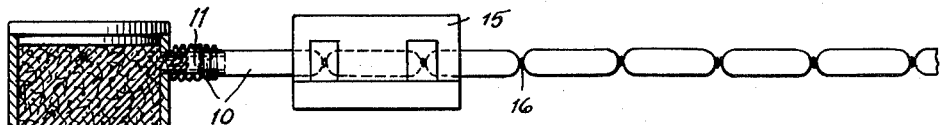
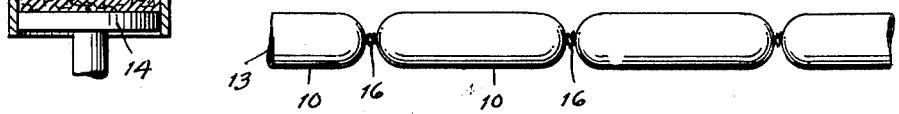
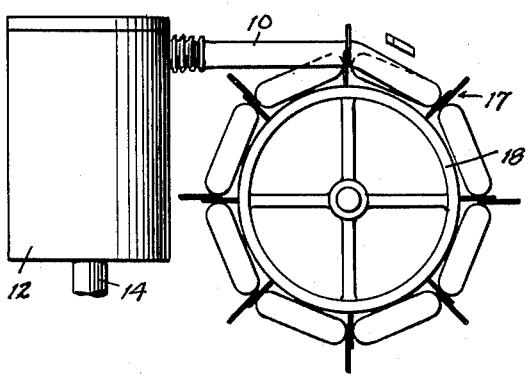
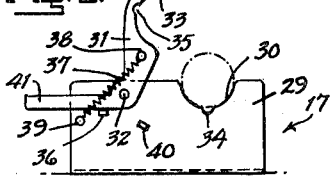
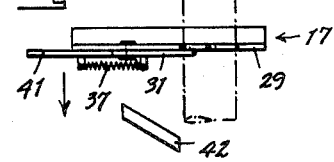
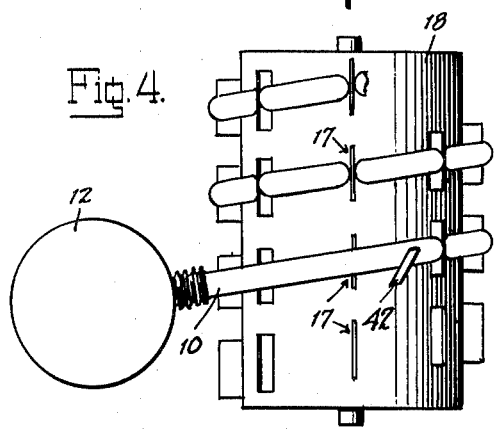
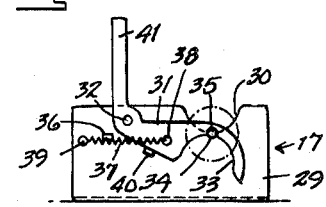
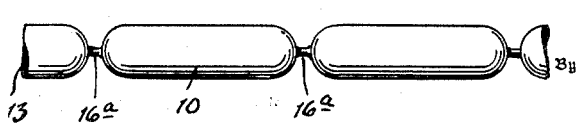
Inventor
ROBERT A. SCHNEIDER
Attorney

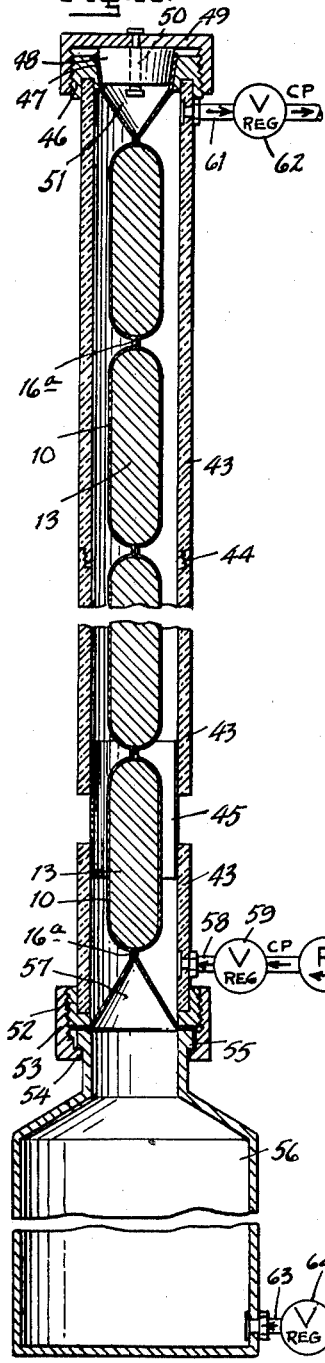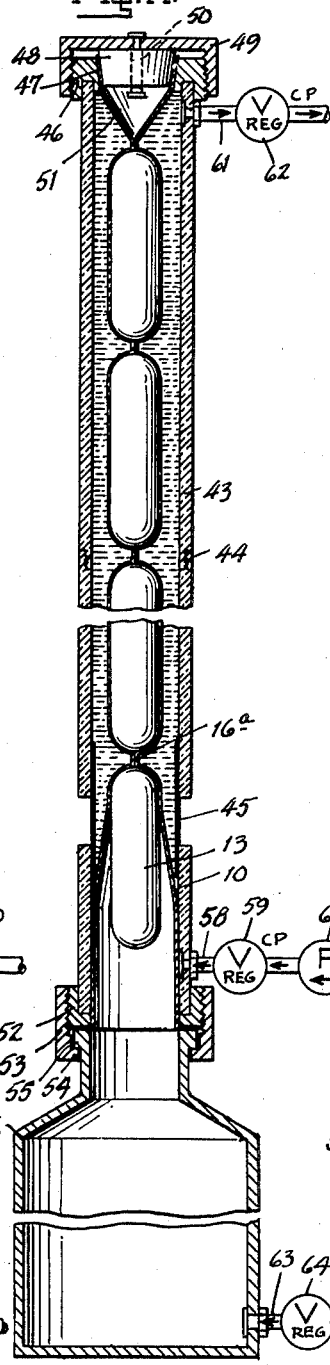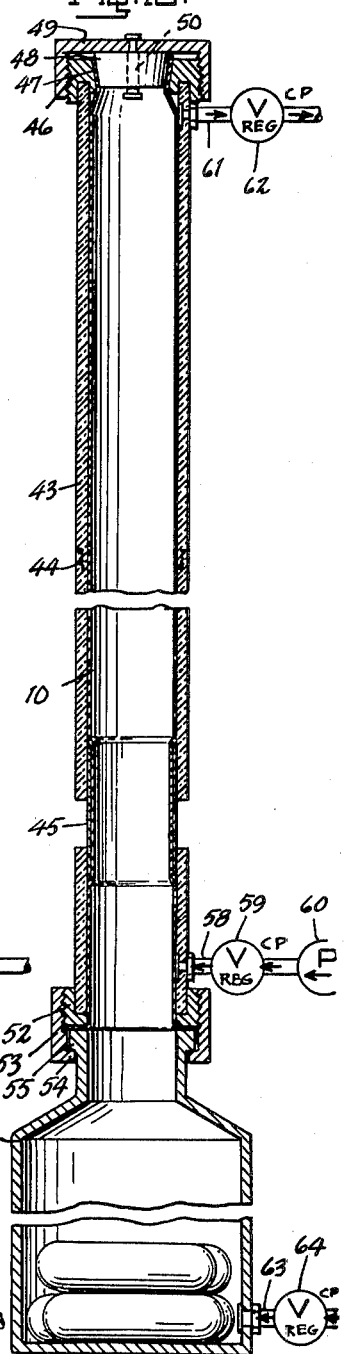

United States Patent Office 2,730,754
Patented Jan. 17, 1956

2,730,754

APPARATUS FOR REMOVING THE CASING OF LINK SAUSAGE AND STRUCTURALLY LIKE PRODUCTS

Robert A. Schneider, Bridgeport, Conn.

Original application December 31, 1949, Serial No. 136,264, now Patent No. 2,644,982, dated July 14, 1953. Divided and this application January 14, 1953, Serial No. 334,185

3 Claims. (Cl. 17—1)

The present invention relates to apparatus for removing the casing of link sausage and structurally like products, and the present application is a division of my application Serial Number 136,264, filed December 31, 1949, now Patent No. 2,644,982, issued July 14, 1953. In the manufacture of link sausage the ground meat or other ingredients of the sausage is forced into an elongated tubular skin or casing which is then tied or constricted at intervals to produce the links, the length of link sausage thus formed being thereupon cooked, smoked, or otherwise processed, this processing having the effect of permanently setting or solidifying the shape of the sausage links. The casings employed have either been natural casings, that is casings prepared from the intestines of meat animals, or synthetic casings which have consisted of various materials substantially similar to natural casings. The natural casings are edible, and for the most part it is customary to leave such casings upon the sausage. However, in the case of synthetic casings it is desirable that they be removed, and heretofore the process of removal has consisted in the manual slitting and peeling of the casings from the sausage links, which method has been costly, time-consuming, and contrary to the best sanitary practice because of the necessity for manual handling of the product.

Among the synthetic casings heretofore employed, certain types of material have the characteristic of becoming stretchable to a high degree when wet, while at the same time having a high resistance to breakage or tearing, one synthetic casing material having this characteristic being known commercially as "Visking." In tying or constricting the links the usual method consists in manually or automatically tying a string at the ends of each link, such string usually being of cotton or similar material, or of twisting the sausage at the ends of each of the links, both of which methods preclude subsequent stretching of the constricted portions of the casing, due to the non-stretching characteristic of the cotton string, and the impossibility of stretching the twisted structure.

It is proposed in the present invention to remove the casing from the length of link sausage after it has been processed to permanently set the shape of the sausage links, by first subjecting the exterior of the length of link sausage to water or other wetting media to render the casing highly stretchable, and thereupon to introduce air under pressure to the interior of the casing, causing the casing to stretch away from the formed sausage links to thereby release them from the casing.

In carrying out this process it is also necessary that the tie or constriction at the end of each link be capable of stretching through internal pressure of air to the point where the diameter of the tied or constricted portion is greater than the diameter of the sausage link, and it is therefore proposed as a step in the process of carrying out the invention to provide a tie or constriction capable of stretching. To this end it is proposed to provide a tie consisting of string formed of a material capable of disintegrating or stretching to a high degree when wet, such material being, for instance cellulose string. In this case the tying process may be carried out by the usual tying apparatus heretofore employing cotton string. It is also proposed according to the invention to produce the tie or constriction by the use of clamping means, adapted to form the constrictions at each end of the sausage link, such clamping means adapted to be removed following the finishing steps, at which time the form of the sausage links is permanently set and the constrictions will remain after removal of the clamping means.

With the above and other objects in view, embodiments of the invention are shown in the accompanying drawings, and these embodiments will be hereinafter more fully described with reference thereto, and the invention will be finally pointed out in the claims.

In the drawings:

Fig. 1 is a schematic view, partially in side elevation and partially in vertical section, showing an apparatus for filling the sausage casing and tying the links.

Fig. 2 is a side elevation on an enlarged scale, showing a length of the link sausage produced by the apparatus shown in Fig. 1.

Fig. 3 is a side elevation of a modified form of apparatus for filling the sausage casing and forming the links by clamping means.

Fig. 4 is a plan view thereof.

Fig. 5 is a detail side elevation, on an enlarged scale, of one of the clamp units employed, the same being shown in open position.

Fig. 6 is a top plan view of the clamp unit, and showing the closing cam therefor.

Fig. 7 is a side elevation showing the clamp unit in closed position.

Fig. 8 is a top plan view of the closed clamp unit, and showing the opening cam therefor.

Fig. 9 is a side elevation, on an enlarged scale, showing a length of the link sausage produced by the apparatus shown in Figs. 3 to 8.

Fig. 10 is a vertical sectional view showing the apparatus for removing the sausage casing, and showing a length of link sausage secured therein.

Fig. 11 is a similar view showing the step of introducing air under pressure within the casing to release the link sausage therefrom.

Fig. 12 is a similar view showing the link sausage removed from the casing and the casing in expanded relation within the apparatus.

Similar reference characters indicate corresponding parts throughout the several figures of the drawings.

Referring to the drawings there are shown in Figs. 1 to 9 thereof two procedures for producing link sausage or structurally like products, according to the invention, preparatory to insertion in the apparatus provided for removing the casing of the link sausage. It is pointed out that the invention contemplates the removal of the casing from various types of sausage, as well as other products enclosed in a casing and having substantially equivalent form.

According to the illustrated exemplary embodiment of the invention, it is proposed to employ a synthetic casing in the form of an elongated tube of a suitable material having the characteristics of toughness, pliability and of becoming stretchable to a high degree when wet. Certain viscose materials are suitable for this purpose, one example being the material commercially produced under the name "Visking." This particular material is a regenerated cellulose with a small amount of glycerin added for softess.

The casing 10 is first placed upon the nozzle 11 of the filling press 12, the entire length of the tube being placed upon the nozzle in a contracted state similar to the contracting of an accordion, one end of the casing being fixed upon the nozzle while the other end is tied over the end of the nozzle. As shown in Fig. 1, a portion of the casing is still in its contracted state upon the nozzle, while the rest of the casing has been filled with the sausage meat 13 through the operation of the press 12. The press has a plunger 14 which forces the ground meat and other ingredients through the nozzle and into the tube, the ground meat being initially forced into the closed end of the casing, and the casing being gradually pulled off the nozzle as it is filled.

The sausage links are formed by a so-called linker unit, indicated at 15, which automatically constricts and ties the links at each end by means of cord ties 16. In the usual production of sausage the linker employs cotton cord, but for the purpose of the present invention a cellulose or similar cord material is employed having the characteristic of disintegrating or of becoming highly stretchable when wet, so that when internal pressure is applied to the casing, the cord ties will not prevent the expansion of the constricted portions of the casing, as would be the case if cotton or similar cord material is employed. While it is preferred to carry out the step of tying or constricting the links by a sausage linking machine unit, which may, for instance, be the type as shown in the patent to Demarest et al., No. 2,307,361, dated January 5, 1943, assigned to Automatic Linker, Inc., Newark, New Jersey, it is pointed out that the constricting ties may be produced manually or in any other suitable manner. The filled casing is next subjected to the usual finishing processes of cooking, smoking and the like, which has the effect of substantially solidifying or fixing the characteristic sausage shape of the links, whereupon the length of link sausage is ready for the step of having the casing removed, as will presently more fully appear.

As shown in Figs. 3 to 9 the links are produced by forming the constrictions at the ends of the links by clamp units, which remain in place during the finishing processes of cooking, smoking, and the like, being thereupon disengaged preparatory to the step of removing the casing, the constrictions in the casing at the ends of the links being retained as a result of the finishing process. The clamp units, indicated generally as 17, are provided in evenly spaced relation along a spiral path provided upon a reel member 18 upon which the length of sausage is adapted to be wound as the casing 10 is filled by the press 12. The reel may be rotated and moved axially in any suitable maner in synchronized relation with the speed of operation of the press, as the spiral of sausage is engaged thereon, so that the clamp units successively move into the same relation to the nozzle.

Each of the clamp units consist of a lower clamp plate 29, having a substantially semi-circular recess 30 in its upper edge in which the length of filled casing is engaged, and a clamping arm 31, pivotally mounted upon the plate 29 by a pivot pin 32, and having a substantially semi-circular recess 33 adapted upon closing of the arm to cooperate with the recess 30 to constrict the sausage to produce the constricted neck or connection 16a at each end of the links, the recesses 30 and 33 being respectively provided with cooperating notches 34 and 35 for confining and forming the constriction. In the open position of the clamping arm 31, as shown in Fig. 5, it is held against a stop lug 36 by means of a spring 37 tied between a pin 38 on the arm and a pin 39 on the plate 29, this spring in the open position of the arm being at one side of the pivot 32. In the closed position of the clamping arm, as shown in Fig. 7, the spring moves to the other side of the pivot 32 and holds the arm in closed position against a stop lug 40. The clamping arm 31 is provided with an angularly extending finger 41, adapted in the open position to lie substantially horizontally and in the closed position to project vertically above the plate 29.

The clamping units are adapted to be successively closed by a fixed cam 42 disposed in the path of the open clamping arm 31 of each clamp unit as it moves into relation to the cam through the rotation and axial movement of the reel, the arm being engaged by the cam and swung downwardly in closing direction to the point where the spring 37 moves over the center of the pivot 32 and draws the arm into closed position.

The reel serves as a portable carrier for the formed length of link sausage which remains thereon during the processes of the cooking, smoking, and the like, and thereupon the reel is adapted to be placed in a suitable fixture or the like for the purpose of releasing the clamps from the link sausage. For this purpose a fixed cam 42a is provided which is adapted to be successively engaged by the raised fingers 41 of the closed clamping arms as the reel is rotated and axially moved in reverse direction to the direction of movement during the formation of the link sausage thereon. When released by the clamps, the length of link sausage is removed from the reel and is ready to have the casing removed.

The apparatus for removing the casing is shown in Figs. 10 to 12, and consists of a vertically disposed tube 43 of approximately the same length as the length of link sausage. If it is assumed that the link sausage is 10 feet long the tube will be approximately 10 feet long, and for convenience of operation may be so disposed in the building that it extends through and between floors. The tube is preferably formed of suitable transparent material to facilitate cleaning and enable the operations taking place within it to be observed, and is preferably formed in several sections screwed together, as at 44. The tube is also preferably extensible, so that its length can be made to correspond to the individual lengths of link sausage, which may vary within inches, and for this purpose a thin telescope tube 45 may be secured in the lower section of the tube 43 with its upwardly projecting end slideably engaged in the lower end of the adjacent tube section. This construction also facilitates the securing of the length of link sausage in the tube, as will presently more fully appear.

At the upper end of the tube 43 there is secured an externally threaded ring 46, having a tapered passage 47 adapted to be wedgingly engaged by a tapered sealing plug 48, having an internally threaded cap 49 rotatably connected thereto for relative vertical movement by a center pin 50. The cap 49 is adapted upon being screwed down upon the ring 46 to wedgingly engage the plug 48 within the opening 47, for the purpose of securing the upper end 50 of the sausage casing in sealed relation in the upper end of the tube. The end 51 of the sausage casing is first wet to render it stretchable and pliable and is then placed within the opening 47, whereupon the plug is engaged within the end of the tube and tightened by screwing down the cap 49, the end of the casing being thus firmly secured within the opening 47. At the same time the space within the tube 43 surrounding the length of link sausage is sealed at its upper end.

Secured upon the lower end of the tube 43 is an externally threaded ring 52 engaged by an internally threaded clamping collar 53, having a flange 54 at its lower end engaged beneath a flange 55 provided at the upper neck end of a receptacle 56 in which the sausage removed from the casing are adapted to fall, as will presently more fully appear. Tightening of the ring 53 clamps the upper end of the receptacle with respect to the ring 52, the lower end 57 of the sausage casing which has first been wet to render it stretchable and pliable being engaged between the ring 52 and the upper end 55 of the receptacle 56 to thus secure the length of link sausage in the tube. At the same time the lower end of the space within the tube 43 surrounding the length of link sausage is sealed and a funnel-like entrance is provided from the receptacle 56 to the interior of the casing.

At the lower end of the tube 43 there is provided an inlet pipe 58 for admitting hot water or other suitable fluid media within the tube 43 in surrounding relation to the sausage casing, this pipe being provided with a constant pressure inlet valve 59, which may be set to any desired pressure, and also provided with a pump 60. At the upper end of the tube 43 there is provided an outlet pipe 61 having a constant pressure outlet valve 62, which may be set to any desired pressure. At he lower end of the receptacle 56 there is provided an inlet pipe 63 for air or other suitable fluid media under pressure having a constant pressure valve 64 which may be set to any suitable pressure.

When the step of securing the length of link sausage within the tube 43 is completed, as shown in Fig. 10, a fluid media, as for instance water under pressure is admitted through the valve 59 to the space within the tube 43 surrounding the length of link sausage. The temperature of the fluid media may be regulataed to any desired degree depending upon the requirements of the particular casing material, it being pointed out that the function of the fluid media is to wet the casing to render it highly stretchable under internal pressure. While water has been found to be satisfactory for this purpose in cooperation with certain casing materials, it is to be understood that steam, gas or other suitable fluid media may be employed with casing materials found to be suitably reactive to such media.

As the tube 43 is gradually filled with water, air is expelled through the valve 62 which is opened for this purpose. When the air is expelled, the valve 59 is closed and the valve 62 is set at a predetermined pressure setting calculated as being somewhat less, as for instance 20 pounds per square inch, than the pressure, as for instance 25 pounds per square inch, of the air or other fluid media, which is next admitted within the casing, as will presently more fully appear. The water or other fluid media surrounding the length of link sausage, in addition to its function of rendering the casing highly stretchable, tends to maintain the centralized position of the length of link sausage in the tube 43 and also provides an external pressure support for the casing.

The next step of the process consists in admitting air or other suitable fluid media under pressure into the receptacle 56 through the valve 64, which is regulated to admit air or other fluid media under pressure somewhat in excess of the pressure at which the valve 62 is set to release the water or other fluid media from the tube 43. The air under pressure enters the lower end 57 of the casing 10, as shown in Fig. 11, forcing the link constriction 16a open and pressing the casing outwardly into engagement with the wall of the tube 43, so that the diameter of the casing is substantially larger than the diameter of the link sausage. As the air travels upwardly between the casing and the link sausage it successively separates the casing from the sausage units and opens the constrictions, thereby allowing the sausage units to drop downwardly through the tube and into the receptacle 56. The gradual filling of the casing with air at the same time forces the water or other fluid media surrounding the casing outwardly through the valve 62 until the entire length of link sausage is released from the casing, the entire casing at this point being forced against the tube 43. By releasing the plug 48 at the upper end of the tube 43 and the sealing ring 53 at the lower end, the casing may be removed from the tube 43 so that the apparatus is ready for removing the casing from another length of link sausage.

The product of my process, as compared to the product of previous methods of casing removal, has an improved outer or skin surface of relatively increased smoothness and homogeneousness due to the compressive effect resulting from the introduction of the compressed air or other fluid media between said outer or skin surface and the casing during the process of removing the latter.

I have illustrated and described preferred and satisfactory embodiments of the invention, but it will be understood that changes may be made therein, within the spirit and scope thereof, as defined in the appended claims.

What is claimed is:

1. Apparatus for removing the casing of link sausage and structurally like products wherein the casing is stretchable, comprising a tube for receiving a length of link sausage or the like in inwardly spaced relation to the inner wall of said tube, annular securing means at at least one end of said tube for fixedly securing the annular margin of an end of said casing in laterally stretched open position in sealed relation with respect to the inner wall of said tube to anchor said casing end against movement and to seal the space between said casing and the inner wall of said tube, and means for admitting a fluid medium under pressure within said open end of said casing whereby said casing is adapted to be expanded away from the encased product toward said inner wall of said tube to release the encased product from said casing.

2. Apparatus for removing the casing of link sausage and structurally like products wherein the casing is stretchable, comprising a tube for receiving a length of link sausage or the like in inwardly spaced relation to the inner wall of said tube, annular securing means at the respective ends of said tube for fixedly securing the respective ends of said casing in laterally stretched open position in sealed relation with respect to the inner wall of said tube to anchor said casing ends against movement and to seal the space between said casing and the inner wall of said tube, and means for admitting a fluid medium under pressure within one open end of said casing whereby said casing is adapted to be expanded away from the encased product toward said inner wall of said tube to release the encased product from said casing.

3. Apparatus for removing the casing of link sausage and structurally like products wherein the casing is stretchable, comprising a tube for receiving a length of link sausage or the like in inwardly spaced relation to the inner wall of said tube, annular securing means at the respective ends of said tube for fixedly securing the respective ends of said casing in laterally stretched open position in sealed relation with respect to the inner wall of said tube to anchor said casing ends against movement and to seal the space between said casing and the inner wall of said tube, means for admitting a fluid medium under pressure within one open end of said casing whereby said casing is adapted to be expanded away from the encased product toward said inner wall of said tube to release the encased product from said casing, means for admitting a fluid medium to said sealed space within said tube in surrounding relation to said length of link sausage or the like secured therein, and means for releasing said fluid medium from said sealed space as said fluid medium is displaced by the expansion of said casing into said space.

References Cited in the file of this patent
UNITED STATES PATENTS
1,789,281   Becker et al. _____ Jan. 13, 1931